United States Patent
Fernandez Dorado et al.

(10) Patent No.: US 12,450,455 B2
(45) Date of Patent: Oct. 21, 2025

(54) MACHINE VISION SYSTEM AND METHOD WITH HYBRID ZOOM OPTICAL ASSEMBLY

(71) Applicant: COGNEX CORPORATION, Natick, MA (US)

(72) Inventors: Jose Fernandez Dorado, Vaals (NE); Laurens Nunnink, Simpelveld (NE)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 18/858,078

(22) PCT Filed: Apr. 28, 2023

(86) PCT No.: PCT/US2023/066413
§ 371 (c)(1),
(2) Date: Oct. 18, 2024

(87) PCT Pub. No.: WO2023/212735
PCT Pub. Date: Nov. 2, 2023

(65) Prior Publication Data
US 2025/0278586 A1  Sep. 4, 2025

Related U.S. Application Data

(60) Provisional application No. 63/336,077, filed on Apr. 28, 2022.

(51) Int. Cl.
*G02B 7/09* (2021.01)
*G02B 26/00* (2006.01)
*G06K 7/10* (2006.01)
*G06K 7/14* (2006.01)

(52) U.S. Cl.
CPC .......... *G06K 7/10722* (2013.01); *G02B 7/09* (2013.01); *G02B 26/004* (2013.01); *G06K 7/1413* (2013.01); *G06K 7/1417* (2013.01)

(58) Field of Classification Search
CPC .............................. G02B 7/09; G02B 26/004
USPC ..................................................... 235/462.11
See application file for complete search history.

(56) References Cited

U.S. PATENT DOCUMENTS

| 10,116,870 B1 | 10/2018 | Nunnink |
| 2014/0183264 A1* | 7/2014 | Nunnink ............ G06K 7/10831 235/462.24 |
| 2019/0094424 A1 | 3/2019 | Fernandez-Dorado |

FOREIGN PATENT DOCUMENTS

| EP | 2739034 A2 | 6/2014 |
| WO | WO-2008076399 A2 * | 6/2008 ............... G02B 3/14 |

OTHER PUBLICATIONS

International Search Report and Written Opinion for PCT/US2023/066413, dated Aug. 30, 2023, 19 pages.

* cited by examiner

*Primary Examiner* — Toan C Ly
(74) *Attorney, Agent, or Firm* — Quarles & Brady LLP

(57) ABSTRACT

An optical assembly for a machine vision system having an image sensor includes a lens assembly and a motor system coupled to the lens assembly. The lens assembly can include a plurality of solid lens elements and a liquid lens, where the liquid lens includes an adjustable membrane. The motor system can be configured to move the lens assembly to adjust a distance between the lens assembly and the image sensor of the vision system.

29 Claims, 4 Drawing Sheets

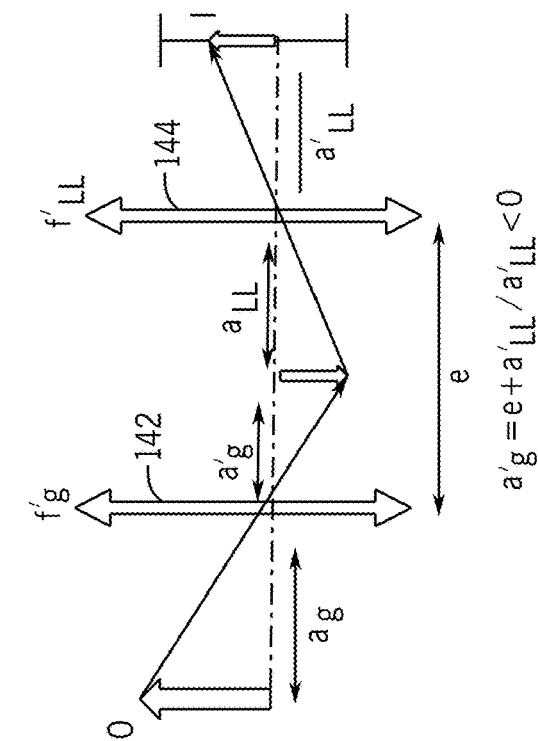
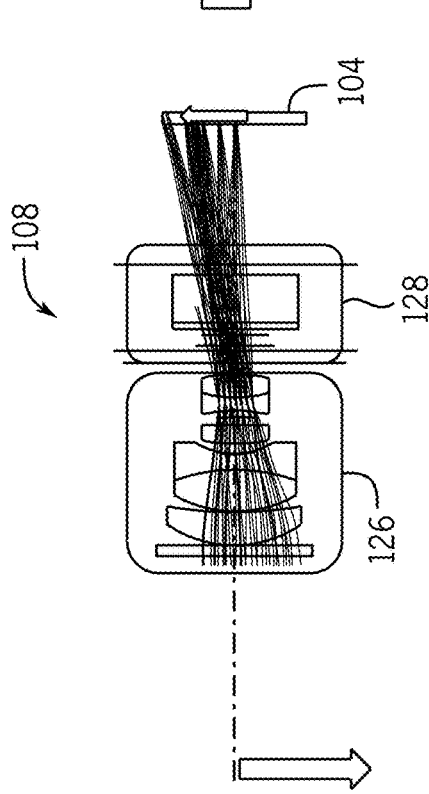
FIG. 3B
FIG. 3A

MACHINE VISION SYSTEM AND METHOD WITH HYBRID ZOOM OPTICAL ASSEMBLY

CROSS-REFERENCE TO RELATED APPLICATIONS

This application represents the United States National Stage of International Application No. PCT/US2022/which is based on, claims priority to, and incorporates herein by reference in their entireties U.S. Provisional Application Ser. No. 63/336,077 filed Apr. 28, 2022 and entitled "Machine Vision System and Method with Hybrid Zoom Optical Assembly."

FIELD

The present disclosure relates generally to machine vision systems and, more particularly, to an optical assembly configured to control focal length and aperture value for image acquisition using a combination of mechanical lens elements and a liquid lens.

BACKGROUND

Machine vision systems (also simply termed "vision systems") use image acquisition devices that include image sensors to deliver information on a viewed subject. The system can then interpret this information according to a variety of algorithms to perform programmed decision-making or identification functions. For example, an image of an object containing features of interest to the system can be acquired by an on-board image sensor (also referred to as simply an "imager" or "sensor") in the visible or near visible light range under appropriate illumination, which can be based upon ambient light or light provided by an internal or external illuminator.

Vision systems may be used for a variety of tasks in manufacturing, logistics and industry. A common task for vision systems is the reading and decoding of symbology (e.g., one-dimensional and two-dimensional codes—also termed "IDs"), which are used in a wide variety of applications and industries and can take the form of ID barcodes, 2D DataMatrix Codes, QR Codes and Dot-Codes, among other. The image sensor acquires images (typically grayscale or color, and in one, two, or three dimensions) of the subject or object, and processes these acquired images using an on-board or interconnected vision system processor. The processor often includes both processing hardware and non-transitory computer-readable program instructions (software) that perform one or more vision system processes to generate a desired output based upon the image's processed information. This image information is typically provided within an array of image pixels each having various colors or intensities. In the example of an ID reader (also termed herein, a "reader"), the user or an automated process acquires an image of an object that is believed to contain one or more barcodes, 2D codes or other ID types. The image is processed to identify encoded features, which are then decoded by a decoding process or processes to obtain the inherent alphanumeric data represented by the code.

Vision systems may also be used for other tasks such as, for example, surface and parts inspection, alignment of objects during assembly, measurement, and any other operations in which visual data is acquired and interpreted for use in further processes. For example, a vision system may be used to inspect objects (e.g., components or parts) on a production line (e.g., during manufacturing processes) to ensure that the objects meet predefined criteria. For example, each object may be expected to contain certain features or characteristics. In an inspection process, the image sensor of the vision system may acquire images of an object and the images may be processed (e.g., using a vision system processor) to identify features or characteristics of the object. The results of the inspection process may be provided to a display for viewing by an operator. If the object passes the inspection, the object may be kept on the production line for further processing and/or handling. If the object fails the inspection, the object may be marked and/or removed from the production line.

SUMMARY

Embodiments of the disclosed technology can provide controllable/controlled movement of a lens assembly that includes liquid and mechanical lenses, to provide collective movement of the liquid and mechanical lenses relative to an image sensor (e.g., in a camera that includes the lens assembly). In combination with corresponding control of a liquid lens, some embodiments can thus provide an improved zoom factor range (i.e., the ratio between maximum and minimum focal lengths) over conventional systems. Thus, for example, a camera for a machine vision system can be operated for image acquisition with multiple aperture values and multiple focal lengths without exchanging hardware.

In accordance with an embodiment, a machine vision system includes an image sensor, an optical assembly, an illumination assembly configured to project a light beam on an object, and a processor device. The optical assembly can include a lens assembly and a motor system coupled to the lens assembly and configured to move the lens assembly. The lens assembly can include a plurality of solid lens elements and a liquid lens, where the liquid lens includes an adjustable membrane. The processor device can be in communication with the lens assembly and the motor system. The processor device can be configured to determine a working distance between the object and the lens assembly, adjust a curvature of the adjustable membrane of the liquid lens based on the working distance, and adjust, using the motor system, a distance between the lens assembly and the image sensor based on the working distance.

In some embodiments, the processor device is in communication with the image sensor and the processor device can be configured to control an acquisition of an image of the object. In some embodiments, the lens assembly can further include a aperture having a fixed size. In some embodiments, the optical assembly can further include a mechanical iris. In some embodiments, a focal plane can be set based on a combination of the curvature of the adjustable membrane of the liquid lens and the distance between the lens assembly and the image sensor. In some embodiments, the machine vision system can further include a distance sensor to obtain distance data corresponding to a distance to the object. In some embodiments, the processor device can be configured to determine the working distance based on the distance data. In some embodiments, adjusting the curvature of the adjustable membrane of the liquid lens and adjusting the distance between the lens assembly and the image sensor controls at least one of a focal length or an aperture value. In some embodiments, the processor device can be configured to control an adjustment of a distance between the liquid lens and the image sensor. In some embodiments, the processor device can be configured to control an adjustment of a distance between the plurality of solid lens elements and the image sensor. In some embodiments, the processor device can be configured to control an adjustment of a distance between the plurality of solid lens elements and the liquid lens.

In accordance with another embodiment, an optical assembly for a machine vision system having an image sensor includes a lens assembly and a motor system coupled to the lens assembly. The lens assembly can include a plurality of solid lens elements and a liquid lens, where the liquid lens includes an adjustable membrane. The motor system can be configured to move the lens assembly to adjust a distance between the lens assembly and the image sensor of the vision system.

In some embodiments, the motor system can be configured to move the liquid lens to adjust a distance between the liquid lens and the image sensor and to adjust a distance between the liquid lens and the plurality of solid lens elements. In some embodiments, the lens assembly can further include an aperture having a fixed size. In some embodiments, the motor system includes a micromotor. In some embodiments, the micromotor is a micro-step motor. In some embodiments, the motor system can be configured to move the lens assembly toward or away from the image sensor. In some embodiments, the motor system can be further configured to move the plurality of solid lens elements to adjust a distance between the plurality of solid lens elements and the image sensor and to adjust a distance between the plurality of solid lens elements and the liquid lens. In some embodiments, the motor system can be further configured to move the plurality of solid lens elements in a first direction and to move the liquid lens in a second direction that is different than the first direction.

In accordance with another embodiment, a method for controlling a focal length and an aperture value of a machine vision system includes determining a working distance between an object and a lens assembly of the machine vision system. The lens assembly can include a plurality of solid lens elements and a liquid lens, and the liquid lens can include an adjustable membrane. The method further includes adjusting a curvature of the adjustable membrane of the liquid lens based on the working distance, and adjusting, using a motor system, a distance between the lens assembly and an image sensor based on the working distance.

In some embodiments, the method further includes acquiring an image of the object via the machine vision system. In some embodiments, determining the working distance between the object and the lens assembly includes determining the working distance based on distance data received from a distance sensor. In some embodiments, adjusting the curvature of the adjustable membrane of the liquid lens and adjusting the distance between the lens assembly and the image sensor controls at least one of a focal length or an aperture value. In some embodiments, the focal length controls a field of view (FOV) and a magnification. In some embodiments, the aperture value controls an amount of light received by the image sensor and a depth of field (DOF). In some embodiments, adjusting a distance between the lens assembly and an image sensor includes changing a position of the lens assembly. In some embodiments, adjusting a distance between the lens assembly and an image sensor includes changing a position of the liquid lens. In some embodiments, adjusting a distance between the lens assembly and an image sensor includes changing a position of the plurality of solid lens elements. In some embodiments, the method further includes adjusting, using the motor system, a distance between the plurality of solid lens elements and the liquid lens by changing a position of the solid lens elements along a first direction and changing a position of the liquid lens along a second direction that is different than the first direction.

BRIEF DESCRIPTION OF THE DRAWINGS

The present disclosure will hereafter be described with reference to the accompanying drawings, wherein like reference numerals denote like elements.

FIG. 3A shows a diagram illustrating an example raytrace for the lens assembly of the hybrid optical assembly of FIGS. 1 and 2 in accordance with an embodiment of the technology;

FIG. 3B illustrates an example schematic reduction of FIG. 3A a to illustrate certain aspects of the lens assembly of FIGS. 1 and 2 in accordance with an embodiment of the technology.

DETAILED DESCRIPTION

Figure 1:
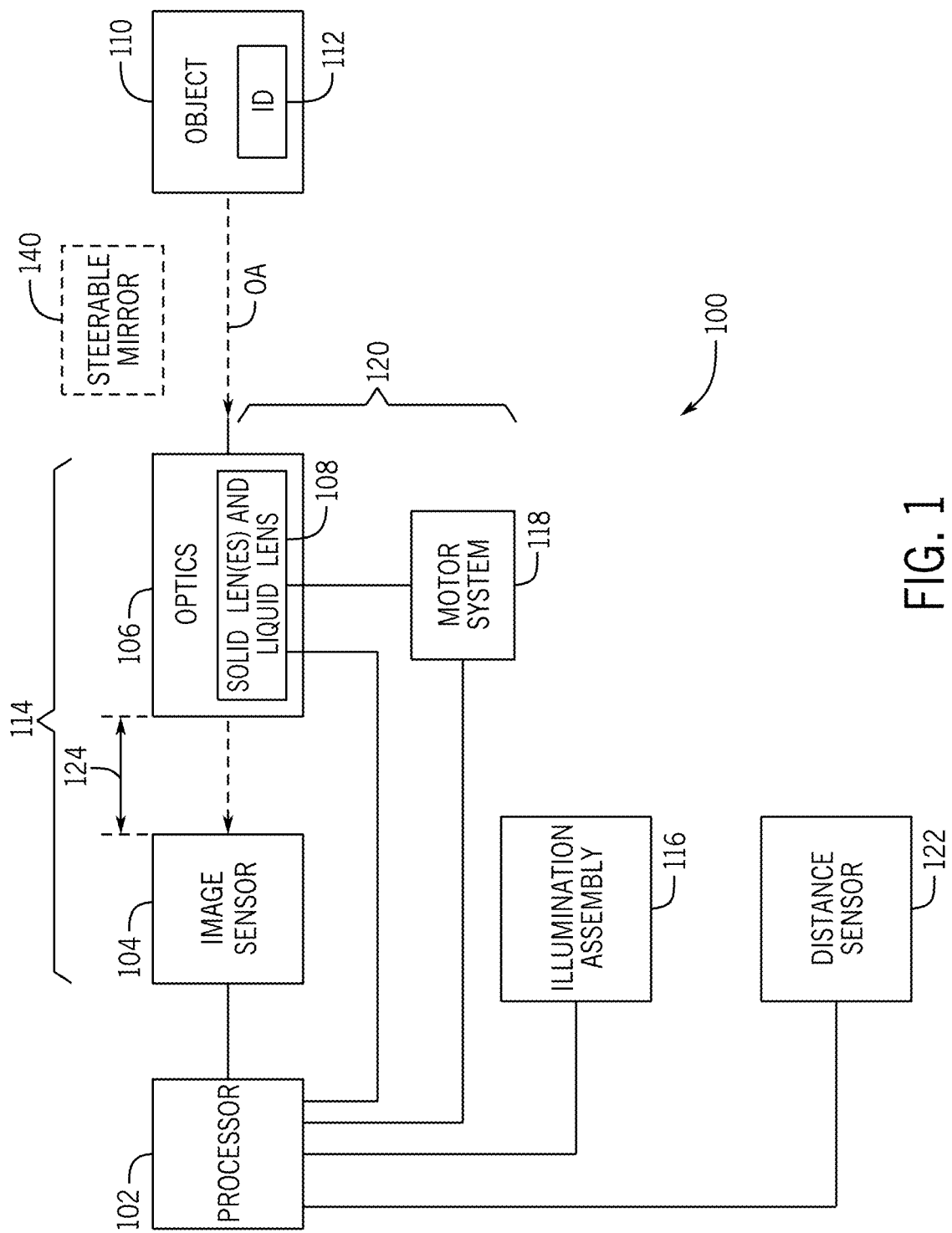
FIG. 1 is a schematic block diagram of a vision system with a hybrid optical assembly in accordance with an embodiment of the technology.

Vision systems may be used in a variety of applications including reading and decoding IDs (e.g., barcodes), logistics (e.g., presentation mode), inspecting objects and surfaces, alignment of objects during assembly, measurement, factory automation, and any other operations in which visual data is acquired and interpreted for use in further processes. ID (e.g., barcode) readers are generally configured to track and sort objects, including along a line (e.g., a conveyor) in manufacturing and logistics operations. The ID reader, or more typically, a plurality (constellation) of readers can be positioned over the line (or otherwise) at an appropriate viewing angle(s) to acquire any expected ID codes on the face(s) of respective objects as they each move through the field of view. The ID reader can also be provided in a handheld configuration that allows the user to move from object to object, for example, on an inspection floor and vary the distance or relative angle between the reader and object surface at will. More generally, the focus distance of the ID reader with respect to the object can vary, depending on the placement of the reader with respect to the line and the size of the object.

Vision systems for inspection are generally configured to capture an image of an object (e.g., a component or part) on a production or assembly line, process the image to determine if the object meets a predefined criteria (e.g., one or more expected features are present), and report the inspection results. Such machine vision systems may aid in the inspection, assembly, and/or handling of various types of articles, parts, and devices, including automotive parts (e.g., fuses, gaskets, and spark plugs), electrical components (e.g., connector pins, keyboards, LED, LCD displays), medical and pharmaceutical products (e.g., disposable test kits, syringes, needles, and date-lot codes), and consumer products (e.g., razor blades and floppy disks).

In operation, some vision systems (e.g., ID readers or inspection systems) or associated lighting attachments function to illuminate the scene containing one or more objects (e.g., ID's, components or parts). For an ID reader, this illumination can include aimers that project a colored dot on the region of interest in the imaged scene, whereby the user can center the image axis of the reader on the barcode within the imaged scene. Illumination for a vision system can also include general illumination to allow acquisition of appropriately detailed images. The illuminated scene is then acquired by an image sensor within the imaging system through optics. The array of pixels of the sensor is exposed, and the electronic value(s) generated for each pixel by the exposure is/are stored in an array of memory cells, as can be termed the "image" of the scene. In the context of an ID-reading application, the scene can include an object of interest that has one or more IDs of appropriate dimensions and type (e.g., direct part marking (DPM) codes, printed barcodes, etc.). The ID(s) are part of the stored image. In the context of an inspection system, the scene can include an area encompassing all pertinent portions of the object of interest in the field of view and the area around the object of interest.

Some important considerations for vision system applications include, for example, field of view size (or zoom, magnification), amount of light received from a target (e.g., an object), and depth of field (DOF). For example, the field of view (FOV), amount of light, and DOF can be key design considerations in applications where the working distance to the target is variable. The optimal FOV, amount of light, and DOF can vary for different vision system applications, including between different images acquired by a particular vision system.

The FOV of a vision system can be controlled by the focal length of lens(es) in the system. The focal length is the distance between the center of the lens to the imaging point (focal plane) where the light for an image is collected and is the inverse of the optical power of the vision system. Typically, a larger focal length can result in a higher magnification and a narrower FOV, and a shorter focal length can result in a lower magnification and a larger (or wider) FOV. The amount of light and DOF of a vision system can be controlled by the size of an aperture (e.g., a diameter) as well as an aperture value (commonly represented as an F number) for the vision system. The aperture value (or F number) can determine the amount of light that enters the image sensor and is proportional to the depth of field. The DOF determines a range of distances from the vision system at which an object is in focus (e.g., sharpness) in an acquired image. Typically, a smaller aperture value (or F number) produces a brighter system (e.g., a larger amount of light) and a smaller DOF, and a larger aperture value (or F number) produces a darker system (e.g., a smaller amount of light) and a larger DOF. A larger DOF allows objects at a wider range of distances from the vision system to be in focus at the same time.

In many conventional vision systems, a single fixed aperture is used. The aperture for a vision system is typically selected based on the expected working distance ranges for the particular application of the vision system. For example, an imaging device can be configured with a fixed structural aperture that provides the maximum DOF at the maximum working distance. In addition, the aperture is typically positioned in a lens assembly between various glass elements which makes it difficult to access the aperture. In many conventional systems, the aperture (and DOF) can only be changed by changing the lens of the system, which can be costly and complex, particularly for a vision system that has already been deployed in the field. In other conventional systems, the aperture may be changed mechanically, however, this typically is slower than may be practical for some applications and has reliability concerns because of the complexity of certain moving parts.

Vision systems may also include an automatic focusing (auto-focus) functionality. For a conventional mechanical lens, for example, the mechanical parts of the lens may be moved to adjust the focus and optical power. However, such mechanical systems based on moving lenses generally can only control the aperture value marginally and cannot control the FOV. For a liquid lens, which has no mechanical moving parts (e.g., to avoid issues with vibration, speed, etc.), a voltage passed through the lens is varied to change the curvature of the liquid lens interface (or membrane). The change in curvature leads to a change of the focal length of the lens. However, systems that control a liquid lens as a focusing element typically have a substantially constant aperture value because the liquid lens is one of the smallest elements in the system, and the liquid lens thus effectively works as the aperture stop, which can make it impossible to vary the aperture value. In addition, for liquid lens systems, the range of change in the focal length may be marginal because a liquid lens typically does not deliver strong optical power to the vision system. Accordingly, such liquid lens systems may also not be able to provide useful control of the FOV of the system. In addition, neither the conventional mechanical systems nor the conventional liquid lens systems noted above can provide control of both zoom capabilities (FOV) and aperture value at the same time.

Among other aspects, the present disclosure describes a vision system (and related method, etc.) that includes an optical assembly configured to enable the control of focal length and aperture value using a combination of mechanical and liquid lens technologies to provide different imaging configurations. In some cases, the disclosed optical assembly can thus advantageously accommodate different focal lengths and aperture values without requiring a change in hardware. Different imaging configurations can usefully provide, for example, a desired field of view (FOV) or zoom, amount of light reflected by an object that is received for imaging, and depth of field (DOF) by controlling the focal length and aperture value based on, for example, working distance.

In some embodiments, the optical assembly can include a lens assembly having both solid and liquid lens elements—e.g., a plurality of solid (e.g., glass) lens elements and at least one liquid lens. A motor system can be coupled to the lens assembly and can be configured to move the lens assembly toward and away from an image sensor in the vision system. Accordingly, the combination of the plurality of solid lens elements and the one or more liquid lenses can be moved together by the motor system (e.g., via motorized movement of a chassis that commonly supports both types of lenses). In some embodiments, the motor system may be used to adjust a distance between the lens assembly and the image sensor to selectively provide particular imaging configurations. In some embodiments, the motor system may be used to move the liquid lens to adjust the distance between the liquid lens and the image sensor, or to adjust a distance between the liquid lens and the plurality of solid lens elements. The liquid lens (or lenses) can include an interface (or membrane) and the curvature of the interface (or membrane) can also be adjusted based on the needs of the system (e.g., for a particular working distance). In some embodiments, the motor system may be used to move the plurality of solid lens elements to adjust a distance between the plurality of solid lens elements and the liquid lens or to adjust a distance between the plurality of solid lens elements and the image sensor. In some embodiments, the motor system may be used to move the plurality of solid lens elements in a first direction and to move the liquid lens in a second direction that is a different direction than the first direction. For example, the motor system can be used to move the plurality of solid lens elements and the liquid lens away from one another or towards one another to adjust a distance between the plurality of solid elements and the liquid lens. In addition, in this example, moving the plurality of solid lens elements and the liquid lens away from one another or towards one another can change the distance between the plurality of solid lens elements and the image sensor and the distance between the liquid lens and the image sensor.

Advantageously, a combination of the position of the lens assembly (e.g., to define a desired distance between the glass and liquid lens elements, collectively, and the image sensor) and the curvature of the liquid lens (or lenses) can be controlled to provide a desired focal length and aperture value for image acquisition, as well as to control one or more desired imaging parameters for the vision system such as, for example, FOV, amount of light, and DOF. In some embodiments, depending on how the curvature of the membrane of the liquid lens (or lenses) and the adjustable distance between the lens assembly and the image sensor are combined, the vision system can be made to be shorter or longer in focal value (i.e., larger or narrower in FOV) and brighter or darker (i.e., lower or higher aperture value). For example, for a certain working distance, both the curvature of the liquid lens (or lenses) and the distance between the lens assembly and the image sensor can be set to produce an image with a certain FOV (i.e., zoom or magnification) and amount of light (i.e., brightness).

In some embodiments, the motor system can include a micromotor such as, for example, a micro-step motor. In some embodiments, the motor system may also include, for example, one or more gears and a thread assembly that can be used to move the lens assembly toward or away from the image sensor.

In some embodiments, the vision system also includes one or more processors (or processor device(s)) and a distance sensor. The processor may be in communication with various other elements of the vision system including, for example, the image sensor, the lens assembly, the motor system and the distance sensor. The distance sensor (e.g., a Time of Flight (TOF) system) may be configured to obtain distance data regarding an object to be imaged by the vision system. In some embodiments, the processor may be configured to determine a working distance to the object based on the distance data from the distance sensor. In some embodiments, the processor may be configured to determine a working distance to the object using other techniques such as, for example, image analysis. Based on the determined working distance, the processor may then be used to adjust the curvature of the interface (or membrane) of the liquid lens in the lens assembly to produce a focal length and to control the motor system to adjust the position of the lens assembly to produce an aperture value. In some embodiments, the processor may determine a desired focal length and aperture value based on the determined working distance by, for example, calculation or a look up table of focal lengths and aperture values by working distance, and then adjust the liquid lens membrane and position of the lens assembly to produce the focal length and aperture value. In some embodiments, the processor may implement a predetermined adjustment of the liquid lens membrane and position of the lens assembly based on the determined working distance. For example, the processor may access and use a look up table of adjustments to the liquid lens membrane or position of the lens assembly based on working distance. In some embodiments, a look up table may be associated with a particular application of the vision system.

In some embodiments, the processor and motor system may be used to adjust a distance between the lens assembly (i.e., the plurality of solid lens elements and the liquid lens together) and the image sensor. In some embodiments, the processor and the motor system may be used to move the liquid lens of the lens assembly to adjust the distance between the liquid lens and the image sensor and to adjust a distance between the liquid lens and the plurality of solid lens elements. In either case, the vision system may then be used to acquire an image of the object at the measured working distance using the appropriate position of the lens assembly or the appropriate position of the liquid lens of the lens assembly. In some embodiments, the focal length and aperture value may also be used to control the field of view (or zoom or magnification), amount of light, and depth of field used for acquiring the image of the object at the measure working distance.

As mentioned above, in some embodiments, the disclosed optical assembly can advantageously accommodate different focal lengths and different aperture values using the same lens(es) or lens assembly without requiring a change in hardware. Thus, the disclosed vision system and optical assembly has the flexibility to be used for a variety of different situations. For example, the disclosed vision system may be used to provide a larger aperture value for larger working distances where collecting as much light as possible is desirable. In another example, the disclosed vision system may change the focal length for a shorter working distance when the camera needs to work at close distances and the FOV is not large enough. As mentioned, advantageously in some embodiments both the focal length and aperture value can be combined because the optical assembly allows for control of both the focal length and aperture value at the same time. Accordingly, the disclosed optical assembly expands the possible uses for existing lenses and, therefore, transform existing lenses into a more polyvalent optical system.

In some embodiments, the disclosed vision system can be used in various vision system applications such as fixed mount readers for logistics (e.g., for presentation mode scanning) or factory automation. Advantageously, the ability to have different aperture values and focal lengths allows the avoidance of multiple camera configurations when working with, for example, different apertures and/or different working distances.

The disclosed vision system and optical assembly can also provide other advantages. For example, the disclosed vision system and optical assembly can allow the camera to have different FOVs and different aperture values for optimizing: 1) the amount of light (e.g., aperture value control), 2) FOV size (zoom or focal length control), and 3) reading range (DOF control). In another example, the disclosed vision system can be used with existing lenses or lens assemblies to expand possible imaging techniques in the field. In yet another example, in some embodiments, the disclosed vision system and optical assembly can be implemented with only one additional hardware assembly required, namely, a motor system including, for example, a micromotor.

In some embodiments, the disclosed system and method can be used to convert a fixed focal lens or lens assembly into multiple sets of imaging options or configurations given the ability to set both the liquid lens interface (or membrane)

curvature and the adjustable distance between the lens (or lens assembly) itself and the image sensor. Accordingly, the lens assembly can be used to transform the vision system into a more versatile imaging system and provide more flexibility to the vision system to address different use cases depending on, for example, how much amount of light and FOV size are required.

In some embodiments, the disclosed optical assembly can be combined with a steerable mirror which is configured to further control an FOV for the vision system. For example, in some embodiments, the disclosed vision system may further include a steerable 2-axes mirror as described in US Published Patent Application No. 2021/0185233, entitled "Machine Vision System and Method with Steerable Mirror," herein incorporated by reference in its entirety. In some embodiments, the steerable mirror may be positioned in front of the lens assembly and may be used to provide additional magnification for each dedicated FOV of the vision system. Combining the disclosed optical assembly with steerable FOV elements such as, for example, a steerable mirror, can advantageously enable larger areas to be covered by the camera and also enable more details in an image due to the zoom effect, which can be important, for example, at larger working distances.

FIG. 1 is a schematic block diagram of a vision system with a hybrid optical assembly in accordance with an embodiment of the technology. While FIG. 1 illustrates an embodiment of a vision system arrangement, it should be understood that the various embodiments described herein may be implemented on different types of vision systems including, but not limited to mobile (e.g., handheld) or fixed mount ID readers, inspection systems, etc. It should be noted that the depicted arrangement of components is illustrative of a wide range of layouts and component types. This illustration is, thus, provided to teach a possible arrangement of components that provide the functions of the illustrative embodiment, although other embodiments can exhibit other configurations.

The vision system 100 includes a processor 102, a vision camera assembly 114, an illumination system 116, and a distance sensor 122 and can be used to acquire an image of an object 110 or an exemplary ID (e.g., a barcode) 112 on the object 110. In the illustrated example, at least the vision camera assembly 114 and the motor system 118 can form part of an integrated assembly (e.g., within or operationally attached to a single housing or module of a single camera). In the illustrated embodiment, the vision camera assembly 114 includes an image sensor 104 and an optical assembly 120. The optical assembly 120 illustrated in FIG. 1 includes optics 106 having a lens assembly 108. An image may be acquired by projecting an illumination light on the object 110 (e.g., via active or passive illumination) and receiving reflected illumination light from the object 110. Thus, the optics 106 of the optical assembly 120 are placed in front of the image sensor 104. The lens assembly 108 of the optical assembly 120 includes a series of lens elements that project the images light onto the area of the image sensor 104 and, correspondingly, define a FOV for imaging with the image sensor 104. The vision system 100 also includes processing components (e.g., processor 102) that perform various vision system tasks such as ID code finding and decoding, inspection, etc.

In some embodiments, the lens assembly 108 includes a plurality of solid (e.g., glass) lens elements and at least one liquid lens (e.g., collectively supported on a common chassis). The motor system 118 is coupled to the lens assembly 108 and thus configured to move the lens assembly 108 (e.g., the plurality of solid lens elements and the liquid lens(es) together) toward or away from the image sensor 104. Advantageously, in some embodiments, the motor system 118 can be used to change the position of the lens assembly 108 to adjust a distance 124 between the lens assembly 108 and the image sensor 104 to selectively provide any of a variety of desired imaging configurations. In some embodiments, the motor system can be used to change the position of the liquid lens by itself to adjust a distance 132 (shown in FIG. 2) between the liquid lens and the plurality of solid lens elements as well as the distance between the liquid lens and the image sensor 104. In some embodiments, the motor system 118 can be used to change the position of the plurality of solid lens elements by itself to adjust a distance 132 (shown in FIG. 2) between the plurality of solid lens elements and the liquid lens as well as the distance between the plurality of solid lens elements and the image sensor 104. In some embodiments, the motor system 118 can be used to change the position of the plurality of solid lens elements along a first direction and to change the position of the liquid lens along a second direction that is different than the first direction. For example, the motor system 118 can be used to move the plurality of solid lens elements and the liquid lens away from one another or towards one another to adjust a distance 132 (shown in FIG. 2) between the plurality of solid elements and the liquid lens. In addition, in this example, moving the plurality of solid lens elements and the liquid lens away from one another or towards one another can change the distance between the plurality of solid lens elements and the image sensor 104 and the distance between the liquid lens and the image sensor 104. The focal distance and optical power of the liquid lens can also be adjusted by varying, for example, a voltage applied to the liquid lens to change the curvature of an interface (or membrane) of the liquid lens. In some embodiments, the motor system 118 can include a micromotor (not shown) such as, for example a micro-step motor. In some embodiments, the motor system 118 may also include, for example, one or more gears and a thread assembly (not shown) that can be used in combination with the micromotor to move the lens assembly 108 toward or away from the image sensor 104. Other embodiments, however, can include a variety of transmission elements for controllable linear movement of the lens assembly 108 relative to the image sensor 104.

The processor 102 can be in communication with the lens assembly 108 (e.g., the liquid lens), the motor system 118 and the distance sensor 122. In some embodiments, the processor 102 can be configured to receive distance data regarding the object from the distance sensor 122. The distance sensor may be, for example, a Time of Flight (TOF) sensor or system. In some embodiments, the processor 102 may use various methods to determine a working distance between the object 110 and the lens assembly 108 based on the acquired distance data. In some embodiments, the processor 102 may be configured to determine a working distance between the object 110 and the lens assembly 108 using other techniques such as, for example, image analysis. In some embodiments, various constraints of the particular vision system application may be considered when determining the working distance to the object including, for example, a speed of the object on a conveyor, a curvature of the object, a size of the ID 112 (e.g., a code) on the object 110, etc. In some embodiments, once the working distance to the object 110 is determined, the processor 102 may be used to set and control a focal length (and the associated optical power and FOV) and an aperture value (and the associated amount of light and DOF) of the vision system 100 based on the determined working distance. For example, the focal length and aperture value may be controlled based on the working distance to obtain a sharp image. In addition, the focal length may be used to control, for example, the FOV, and the aperture value may be used to control, for example, the amount of light reflected from the object 110 and a DOF.

Based on the determined working distance, the processor may be used to adjust the curvature of the interface (or membrane) of the liquid lens in the lens assembly to produce a focal length and to control the motor system to adjust the position of the lens assembly to produce an aperture value. In some embodiments, the processor may determine a desired focal length and aperture value based on the determined working distance by, for example, calculation or a look up table of focal lengths and aperture values by working distance, and then adjust the liquid lens membrane and position of the lens assembly to produce the identified focal length and aperture value. In some embodiments, the processor may implement a predetermined adjustment of the liquid lens membrane and position of the lens assembly based on the determined working distance. For example, the processor may access and use a look up table of adjustments to the liquid lens membrane or position of the lens assembly based on working distance. In some embodiments, a look up table may be associated with a particular application of the vision system.

In some embodiments, both the focal length (or focal value) and the aperture value (or F number) may be different for different working distances. In one example application, when the working distance is increased, the feature or object to be imaged appears smaller. In this example application, it is assumed that the amount of light is sufficient for all possible working distances of the application. Based on the working distance, the focal length can be controlled (e.g., a larger focal length) to produce an optimal magnification, and the aperture value may be controlled (e.g., a larger aperture value) to produce an optimal DOF. In this example application, the focal length and aperture value may be controlled so that the larger the working distance, the larger the aperture value (or F number) and the larger the focal length (or focal value). Accordingly, the vision system may be configured for a large FOV at close working distances with a larger DOF. In another example application, an image of a larger object needs to be created at larger working distances. In this example application, the amount of light may be limited for larger working distances. The disclosed system, however, may be used to expand the FOV (i.e., a shorter focal length (or focal value)). Based on the working distance, the focal length can be controlled (e.g., a shorter focal length) to produce a larger FOV. In this example application, the focal length and the aperture value may be controlled so that the larger the working distance, the lower the aperture value (or F number) and the shorter the focal length (or focal value). Accordingly, the vision system may be configured for a large FOV at larger working distances with a larger acceptance or amount of light.

In some embodiments, one of the focal length or aperture value may be the same for all working distances and the other of the focal length or aperture value may be different for different working distances. In an example application, the focal length may be the same for all working distances (i.e., the magnification is sufficient) but the amount of light needs to be increased (i.e., more light needs to be collected) at larger working distances. In this example application, the amount of light may be controlled by controlling a combination of the optical power of the liquid lens and the distance of the lens from the image sensor. Accordingly, the visions system may be configured to provide the required brightness at large working distances. In this example application, the focal length and the aperture value may be controlled so that the larger the working distance, the lower the aperture value (or F number) and the shorter the focal length (or focal value).

The processor 102 may be configured to adjust the curvature of the interface of the liquid lens in the lens assembly 108, for example, by applying a voltage to the liquid lens, to produce and set a focal length. In addition, the processor 102 may be used to control the motor system 118 to, for example, adjust the distance between the lens assembly 108 and the image sensor 104 to produce and an aperture value. In some embodiments, the processor 102 may be used to control the motor system 118 to adjust the distance 132 (shown in FIG. 2) between the liquid lens of the lens assembly 108 and the image sensor 104 as well as the distance between the liquid lens and the image sensor 104.

In some embodiments, the lens assembly 108 can have a fixed aperture size (i.e., diameter). In some embodiments, the lens assembly 108 can further include a mechanical iris (not shown) which can provide an additional parameter to control in addition to the curvature of the liquid lens interface and the distance between the lens assembly 108 and the image sensor 104. In particular, the mechanical iris can be used to expand the range of possible aperture values (or F numbers) for the vision system 100 by changing the size of the mechanical iris.

In some embodiments, a combination of adjusting the distance between the lens assembly 108 and the image sensor 104 and an adjustment of the curvature of the liquid lens in the lens assembly 108 may advantageously be used to enable the automated adjustment and control of focal length and aperture value for images at, for example, different working distances. In addition, a focal plane of the lens assembly may be set based on the combination of adjusting the curvature of the membrane of the at least one adjustable liquid lens and the distance between lens assembly and the image sensor. By controlling the focal length and aperture value, various characteristics and parameters of the vision system can be controlled such as, for example, FOV, amount of light, and DOF. In some embodiments, the focal length and aperture value can be controlled for a single image of an object, for multiple images of an object, or for each image in a series of images of an object. Generally, although some specific examples are provided above, the processor 102 can generally be configured to determine a particular imaging configuration (e.g., focal length and aperture value) for a particular image acquisition based on any variety of considerations for machine vision operations, to be implemented via control systems and processes according to embodiments of the disclosed technology.

The processor 102 may also be in communication with the image sensor 104 and the illumination assembly 116. The illumination assembly 116 can be configured to provide illumination, for example, light of particular wavelength bands centered on the visible spectrum, light of particular polarizations, etc. In some embodiments, the illumination assembly can include one or more LEDs or laser diodes to provide the illumination light (or light beam(s)). Light projected from the illumination assembly 116 that is reflected from the object 110 back to the vision system 100 is directed through the lens assembly 108 along a reader optical axis (OA) to the image sensor 104. The image sensor 104 can be configured to detect different wavelengths of light or can also be configured to detect different polarizations of light. In some embodiments, the image sensor 104 may be a monochromatic sensor (e.g., black and white) or a color sensor. The reflected light is received by the image sensor 104 for processing (e.g., by processor 102) to, for example, generate an image of the subject (e.g., object 110). Various methods may be used for generating an image of the scene and decoding data therein.

In some embodiments, the processor 102 can include one or more processor devices that can be provided on one or more circuit boards and operatively interconnected by the appropriate ribbon cable(s) or other communication channels (not shown). The processor 102 can be configured to control vision system analysis processes (e.g., ID reading and decoding) as well as other functions, such as illumination for image acquisition (e.g., timing or intensity of illumination, selection of a light source for illumination, etc.), automatic focus adjustment, etc. System 100 may also be configured to wirelessly transmit (via a wireless link, not shown) decoded data to a data handling device such as an inventory tracking computer or logistics application. Alternatively, the system 100 may be wired to a data handling network or can store and subsequently transfer collected information when it is connected to a base unit. The processor 102 may also be in communication with a variety of other components (not shown), such as motors for adjustment of system orientation, or a variety of other actuators.

In some embodiments, the disclosed optical assembly 120 can be combined with an optional steerable mirror 140 which is configured to further control an FOV for the vision system. In some embodiments, the steerable mirror 140 may be a steerable 2-axes mirror. The steerable mirror 140 may be positioned in front of the lens assembly 108 and may be used to provide additional magnification for each dedicated FOV of the vision system 100. Combining the disclosed optical assembly 120 with steerable FOV elements such as, for example, a steerable mirror 140, can advantageously enable larger areas to be covered by the camera 114 and also enable more details in an image due to the zoom effect, which can be important, for example, at larger working distances.

Figure 2:
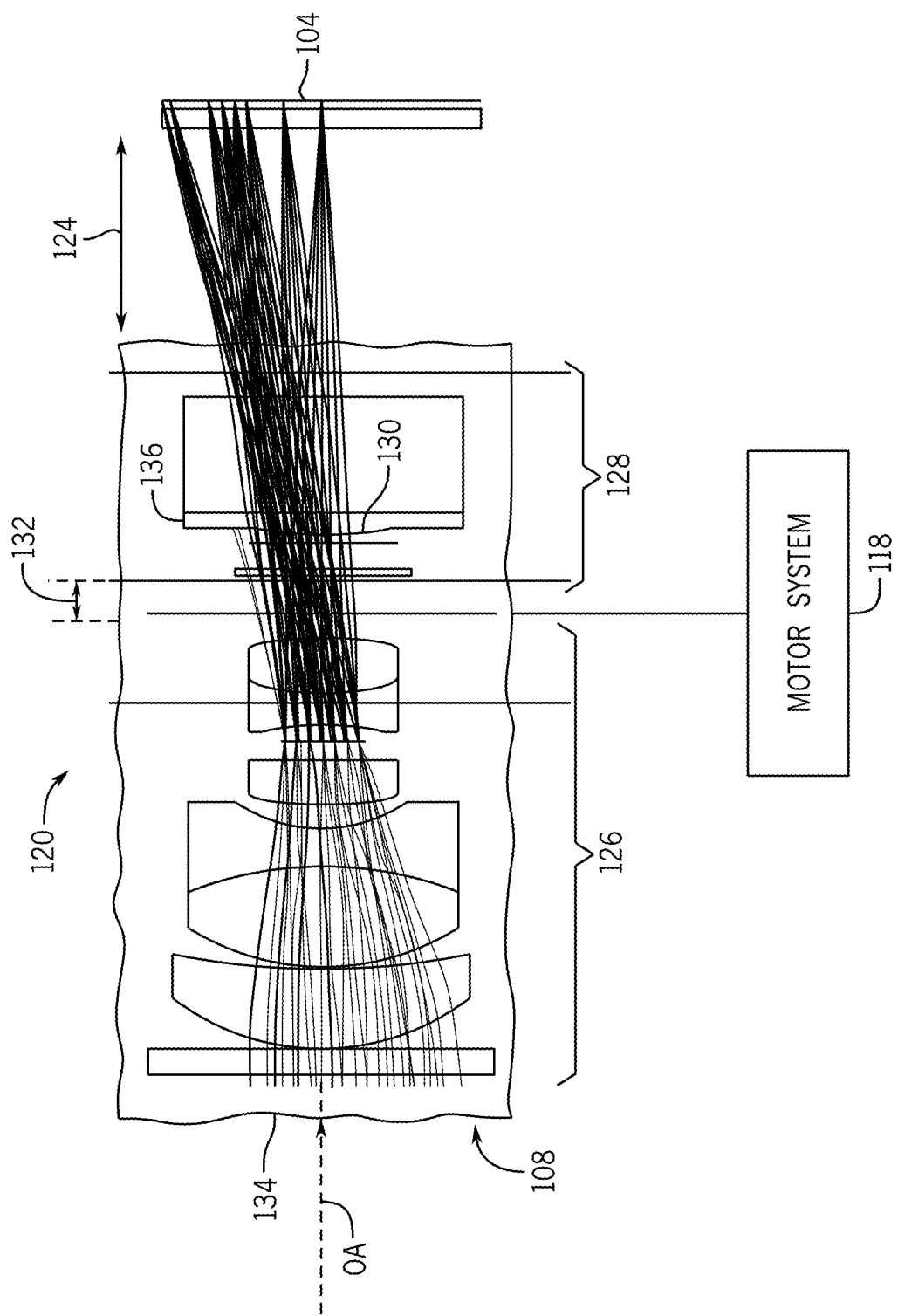
FIG. 2 is a schematic block diagram of a hybrid optical assembly in accordance with an embodiment of the technology.

FIG. 2 is a schematic block diagram of an example hybrid optical assembly in accordance with an embodiment of the technology, implemented for the hybrid optical assembly 120 of FIG. 1. In the illustrated example, the hybrid optical assembly 120 can include the lens assembly 108 and the motor system 118 coupled to the lens assembly 108. Light projected from an illumination assembly (e.g., illumination assembly 116 shown in FIG. 1) that is reflected from an object (e.g., object 110) back to the vision system may be directed through the lens assembly 108 along a reader optical axis (OA) to the image sensor 104. Accordingly, the lens assembly 108 can project the light reflected from the object onto the image sensor 104.

As shown in the example of FIG. 2 in particular, the lens assembly 108 can include a plurality of solid (e.g., glass) lens elements 126 at least one liquid lens 128. In some embodiments, the plurality of solid lens elements 126 and the liquid lens 128 may be located in a housing 134 and the motor system 118 may be coupled to the housing 134. As also noted above, in some embodiments, the motor system 118 can include a micromotor such as, for example a micro-step motor. Likewise, in some embodiments, the motor system 118 may include, for example, one or more gears and a thread assembly (not shown) that can be used in combination with the micromotor to move the lens assembly 108 toward or away from the image sensor 104. The motor system 118 can be controlled, for example, using the processor 102 of vision system 100 (shown in FIG. 1), to move the position of the lens assembly 108 (i.e., the plurality of solid lenses 126 and the liquid lens 128 together). For example, the motor system 118 can be controlled to adjust a distance 124 between the lens assembly 108 and an image sensor 104 of the vision system based on a determined working distance or other relevant parameters. In some embodiments, the motor system 118 can be controlled (e.g., using the processor 102 of vision system 100) to change the position of the liquid lens 128 only (i.e., to adjust a distance between the liquid lens 128 and the lens elements 126). For example, the motor system 118 can be controlled to adjust the distance 124 between the liquid lens 128 and the image sensor 104 as well as a distance 132 between the liquid lens 128 and the plurality of solid lens elements 126. In some embodiments, the motor system 118 can be controlled (e.g., using the processor 102 of vision system 100) to change the position of the plurality of solid lens elements 126 only, for example, to adjust a distance 132 between the plurality of solid lens elements 126 and the liquid lens 128 as well as the distance between the plurality of solid lens elements 126 and the image sensor 104). In some embodiments, the motor system 118 can be controlled (e.g., using the processor 102 of vision system 100) to change the position of the plurality of solid lens elements 126 along a first direction and to change the position of the liquid lens 128 along a second direction that is different than the first direction. For example, the motor system 118 can be controlled to move the plurality of solid lens elements 126 and the liquid lens 128 away from one another or towards one another to adjust the distance 132 between the plurality of solid lens elements 126 and the liquid lens 128. In addition, in this example, moving the plurality of solid lens elements 126 and the liquid lens 127 away from one another or towards one another can change the distance between the plurality of solid lens elements 126 and the image sensor 104 and the distance between the liquid lens 128 and the image sensor 104. As mentioned above, the distance 124 required between the lens assembly 108 (or, in some embodiments, liquid lens 128) and the image sensor 104 and/or the distance 132 between the liquid lens 128 and the plurality of solid lens elements 126 may be adjusted based on a measured working distance to the object (e.g., object 110 shown in FIG. 1) to be imaged by the vision system.

In some embodiments, the lens assembly 108 can have a fixed aperture size (i.e., diameter). In some embodiments, the lens assembly 108 can further include a mechanical iris (not shown) which can be used to expand the range of possible aperture values (or F numbers) for the vision system by changing the size of the mechanical iris (e.g., in combination with control of the motor system 118 and the liquid lens 128, to adjust aperture value overall).

The liquid lens 128 can include an interface (or membrane) 136 that can have an adjustable curvature 130. In some embodiments, the curvature 130 of the liquid lens interface 136 may be adjusted by applying a voltage to the liquid lens interface 136, for example, using a processor such as processor 102 of the vision system 100 shown in FIG. 1. As mentioned above, the curvature of the liquid lens interface 136 may be adjusted based on a working distance measured to the object (e.g., object 110 shown in FIG. 1) to be imaged by the vision system.

As mentioned above, by controlling the focal length and aperture value using the optical assembly 120, various characteristics and parameters of the vision system can be controlled such as, for example, FOV, amount of light, and DOF. In some embodiments, the focal length and aperture value can be controlled for a single image of an object, for multiple images of an object, or for each image in a series of images of an object.

FIG. 3A shows a diagram illustrating an example raytrace for the lens assembly of the hybrid optical assembly of FIGS. 1 and 2 in accordance with an embodiment of the technology. As discussed above, the lens assembly 108 can include a plurality of lens elements including a plurality of solid lens elements 126 and at least one liquid lens 128. The lens assembly 108 can be used to project light reflected from an object being imaged onto an image sensor 104. In addition, as discussed above, the focal length and aperture value defined by the lens assembly 108 can be controlled based on the needs of the vision system to acquire an image of an object, for example, for a particular working distance.

FIG. 3B illustrates a reduction of a complex system of the lens assembly of FIG. 3A, in accordance with an embodiment of the technology, which can further illustrate the principles and benefits of the disclosed optical assembly and method to control focal length and aperture value using a combination of mechanical and liquid lens technologies to provide different imaging configurations. As discussed above, the disclosed optical assembly including the lens assembly 108 can advantageously accommodate different focal lengths and aperture values without requiring a change in hardware. The different imaging configurations can provide, for example, a desired field of view (FOV) or zoom, amount of light reflected by an object, and depth of field (DOF) by controlling the focal length and aperture value based on, for example, working distance. In FIG. 3B, the complex system of the lens assembly 108 is reduced into two single components, namely, the plurality of solid (e.g., glass) lens elements 126, represented by arrow 142, and the liquid lens 128, represented by arrow 144. In addition, the following distances of interest are illustrated: 1) $a_g$=an object distance (for object O) to the solid lens elements 142 (i.e., a working distance for the object O); b) $f'_g$=a focal length of the solid lens elements 142; c) $a'_g$=an image distance (for image I) with regard to the solid lens elements 142; d) $a_{LL}$=an object distance with regards to the liquid lens 144; e) $f'_{LL}$ is a focal length of the liquid lens 144; f) $a'_{LL}$=an image distance with regards to the liquid lens 144 (i.e., the image sensor plane); and g) e=a coupling optical distance between solid elements 142 and liquid lens 144. The image distance, $a'_g$, with regard to the solid lens elements 142 can be given by:

$$a'_g = e + a'_{LL}/a'_{LL} < 0 \qquad \text{Eqn. 1}$$

In the field of optics, every pair of lenses can effectively work as only one lens element and thus any number of lenses can also be described as only one element through a coupling optical systems equation (or, simply, coupling equation). The main elements in the lens assembly 108 are the solid lens elements 126, 142 which are fixed and the liquid lens 128, 144, which is a dynamic element and, accordingly, can affect the rest of the system. The coupling equation for the assembly 108 can thus be expressed as:

$$f'_{total} = \frac{f'_g f'_{LL}}{f'_g + f'_{LL} - e} \qquad \text{Eqn. 2}$$

where $f'_{total}$ is the total focal length for the system 108. Given the fact that only the liquid lens element, $f'_{LL}$, can vary in Eqn. 2, the total focal length of the system, $f'_{total}$, is typically considered to be limited to a very narrow set of focal values which is typically marginal, with corresponding shortcomings in conventional systems (e.g., as described above). However, another potential degree of freedom of the assembly 108 is the possibility of moving the entire system 108 which makes the $a'_{LL}$ distance a variable.

Taking into account the relationship between e, $a'_g$ and $a_{LL}$, and the fact that the focal length of the solid lens elements 142 can be given by:

$$f'_g = \frac{a_g a'_g}{a_g + a'_g}, \qquad \text{Eqn. 3}$$

the expression of $f'_g$ in Eqn. 3 can be substituted in the equation for total focal length, $f'_{total}$, given by Eqn. 1 and can be used to derive a relationship between the focal length, $f'_{total}$, as a function of the focal power, $f'_{LL}$, of the liquid lens 144 and the distance $a'_{LL}$ which is the distance that can be changed via full displacement of the lens assembly 108 with respect to the image sensor 104. Accordingly, the total focal length, $f'_{total}$, can be expressed as:

$$f'_{total} = \frac{(f'_{LL})^2(a'_{LL}+1) - f'_{LL}a'_{LL}e}{(f'_{LL})(a_g - e - a'_{LL}) + f'_{LL}[a'_{LL}(1 - a_g + 2e) + e(e + 1 - a_g)] + ea'_{LL}(a_g - 1)} \qquad \text{Eqn. 4}$$

Equation 4 above illustrates, for example, how the zoom effect can be accomplished taking into account only two parameters, namely, the focal power of the liquid lens 144 (i.e., curvature of the membrane) and the distance between the lens assembly 108 and the image sensor 104 (e.g., the adjustable distance 124 shown in FIGS. 1 and 2).

Finally, the aperture value (i.e., the F number) can be given by:

$$F\# = \frac{1}{2n\sin\left[\tan^{-1}\left(\frac{\phi_{LL}}{2a'_{LL}}\right)\right]} = \frac{1}{2\sin\left[\tan^{-1}\left(\frac{\phi_{LL}}{2a'_{LL}}\right)\right]} \qquad \text{Eqn. 5}$$

where n=1 since this refers to the refraction index of the medium in contact with the image sensor 104. Because $a'_{LL}$, the image distance with regard to the liquid lens, is deeply connected to the values of both the focal power of the entire system, $f'_{total}$, and the focal power of the liquid lens, $f'_{LL}$, the following equations can be used to describe the relationships between input values of, e.g., liquid lens optical power and liquid lens image distance, and operational values for focal length of the system (zoom effect), $f'_{total}$, and the aperture values, F # for imaging at particular working distances ($a_g$).

$$f'_{total} = \frac{(f'_{LL})^2(a'_{LL}+1) - f'_{LL}a'_{LL}e}{(f'_{LL})(a_g - e - a'_{LL}) + f'_{LL}[a'_{LL}(1 - a_g + 2e) + e(e + 1 - a_g)] + ea'_{LL}(a_g - 1)} \qquad \text{Eqn. 6}$$

$$F\# = \frac{1}{2\sin\left[\tan^{-1}\left(\frac{\phi_{LL}}{2a'_{LL}}\right)\right]} \qquad \text{Eqn. 7}$$

In particular, as also generally discussed above, it can thus be seen that a combination of a collectively movable mechanical and liquid lenses (or, generally, a movable liquid lens), in combination with adjustments to liquid lens optical power, can provide an imaging system with substantial adjustability for both focal length and F # values.

Figure 4:
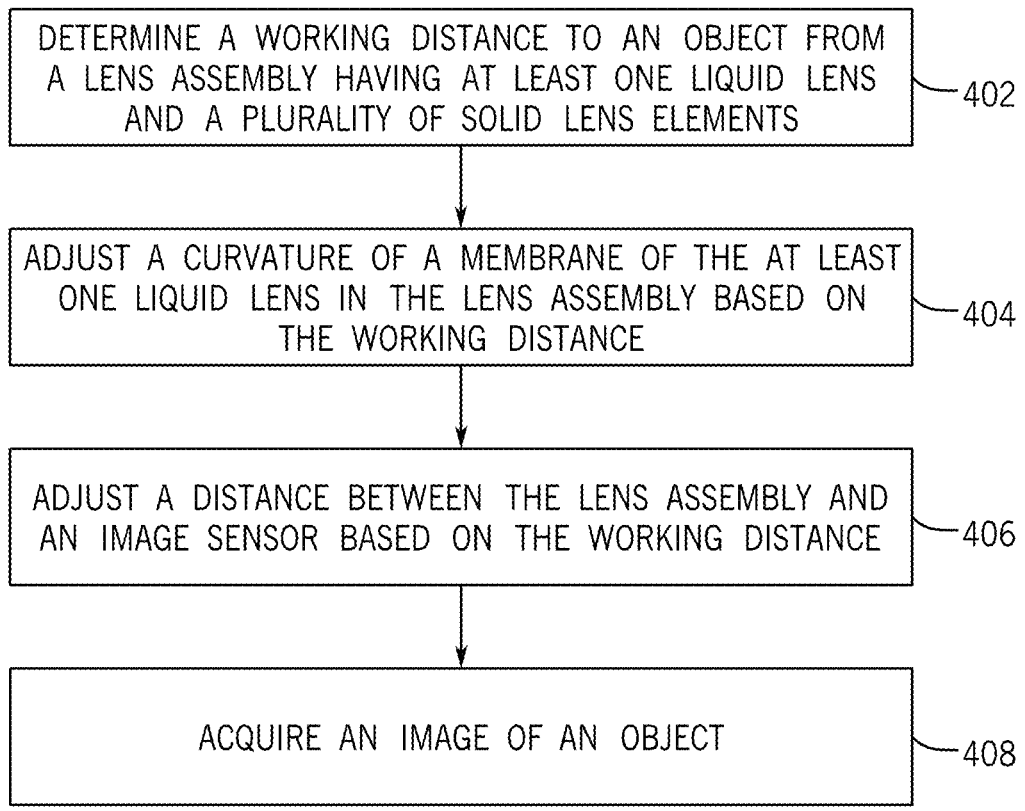
FIG. 4 illustrates a method for controlling a focal length and an aperture value of a vision system in accordance with an embodiment of the technology.

FIG. 4 illustrates a method for controlling focal length and aperture value of a vision system in accordance with an embodiment of the technology. At block 402, a working distance between an object to be imaged and a lens assembly of an optical assembly of the vision system is determined. Generally, various methods may be used to determine the working distance to the object. For example, in some embodiments, an integrated or attached distance sensor (e.g., a TOF sensor) may be used to acquire distance data for the object and a processor may be used to determine the working distance based on the acquired distance data from the distance sensor. In some embodiments, the working distance to the object may be determined using other techniques such as, for example, image analysis. In some embodiments, various constraints of the particular vision system application may be considered when determining the working distance to the object and can include, for example, a speed of the object on a conveyor, a curvature of the object, a size of the ID (e.g., a code) on the object, etc. In some embodiments, the lens assembly includes a plurality of solid lens elements and a liquid lens, and the working distance is measured between the plurality of solid lens elements and the object.

At block 404, a curvature of an interface (or membrane) of the liquid lens in the lens assembly may be adjusted based on the measured working distance. For example, in some embodiments, a processor may be used to apply a voltage to the liquid lens interface to change the curvature. In some embodiments, a desired focal length may be determined (e.g., using a processor) based on the measured working distance by, for example, calculation or a look up table that includes at least predetermined focal lengths by working distance. In some embodiments, a predetermined adjustment of the liquid lens membrane may be identified (e.g., using a processor) using a look up table including at least a set of predetermined adjustments to the liquid lens membrane based on working distance. In some embodiments, each look up table may be associated with a particular application of the vision system.

At block 406, a distance between the lens assembly and an image sensor in the vision system may be adjusted based on the measured working distance. For example, in some embodiments, the optical assembly can also include a motor system that may be coupled to the lens assembly. In some embodiments, the motor system may be controlled by a processor to move the lens assembly toward or away from the image sensor to adjust the distance between the lens assembly and the image sensor. In some embodiments, the motor system is used to move the entire lens assembly, namely, the plurality of solid lens elements and the liquid lens(es) together. In some embodiments, the motor system may be used to move the liquid lens of the lens assembly toward the image sensor and away from the plurality of solid lens elements or to move the liquid lens away from the image sensor and toward the plurality of solid lens elements. In some embodiments, the motor system may be used to move the plurality of solid lens elements of the lens assembly toward the liquid lens and the image sensor and to move the plurality of solid lens elements away from the liquid lens and the image sensor. In some embodiments, the motor system may be used to move the plurality of solid lens elements in a first direction and the move the liquid lens in a second direction that is different than the first direction. For example, the motor system 118 may be used to move the plurality of solid lens elements and the liquid lens away from one another or towards one another. Thus, for example, a third input parameter corresponding to the distance, e, in FIG. 3B (e.g., in addition to optical lens focal length and optical lens image distance) can be controlled to provide optimized imaging configurations. In some embodiments, a desired aperture value may be determined (e.g., using a processor) based on the measured working distance by, for example, calculation or a look up table that includes at least predetermined aperture values by working distance. In some embodiments, a predetermined adjustment of the position of the lens assembly may be identified (e.g., using a processor) using a look up table including at least a set of predetermined adjustments of the position of the lens assembly based on working distance. In some embodiments, each look up table may be associated with a particular application of the vision system.

In some embodiments, the lens assembly has a fixed aperture size. In some embodiments, the lens assembly may also include a mechanical iris which can be used to expand the range of possible aperture values (or F numbers) for the vision system by changing the size of the mechanical iris. As mentioned above, by controlling the focal length and aperture value various characteristics and parameters of the vision system can be controlled such as, for example, FOV, amount of light, and DOF. For example, the FOV, amount of light, and DOF can be controlled based on the needs of the vision system for the measured working distance.

At block 408, the vision system can be used to acquire an image of the object using the desired focal length and aperture value based on the measured working distance for the object. Various methods may be used for generating an image of the scene and decoding data therein.

The foregoing has been a detailed description of illustrative embodiments of the technology. Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present disclosure, what has been described herein is merely illustrative of the application of the principles of the present disclosure. Accordingly, the description is meant to be taken only by way of example, and not to otherwise limit the scope of this disclosure.

In some embodiments, aspects of the technology, including computerized implementations of methods according to the technology, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the technology can be implemented as a set of instructions, tangibly embodied on a non-transitory computer-readable media, such that a processor device can implement the instructions based upon reading the instructions from the computer-readable media. Some embodiments of the technology can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are understood in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the technology, or of systems executing those methods, may be represented schematically in the FIGs. or otherwise discussed herein. Unless otherwise specified or limited, representation in the FIGs. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the technology. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

The invention claimed is:

1. A machine vision system comprising:
    an image sensor;
    an optical assembly comprising:
        a lens assembly comprising a plurality of solid lens elements and a liquid lens, wherein the liquid lens includes an adjustable membrane; and
        a motor system coupled to the lens assembly and configured to move the lens assembly;
    an illumination assembly configured to project a light beam on an object; and
    a processor device in communication with the lens assembly and the motor system, the processor device being configured to:
        determine a working distance between the object and the lens assembly;
        adjust a curvature of the adjustable membrane of the liquid lens based on the working distance; and
        adjust, using the motor system, a distance between the lens assembly and the image sensor based on the working distance.

2. The machine vision system according to claim 1, wherein the processor device is in communication with the image sensor and the processor device is further configured to control the acquisition of an image of the object.

3. The machine vision system according to claim 1, wherein the lens assembly further comprises an aperture having a fixed size.

4. The machine vision system according to claim 1, wherein the optical assembly further comprises a mechanical iris.

5. The machine vision system according to claim 1, wherein a focal plane is set based on a combination of the curvature of the adjustable membrane of the liquid lens and the distance between the lens assembly and the image sensor.

6. The machine vision system according to claim 1, further comprising a distance sensor configured to obtain distance data corresponding to a distance to the object.

7. The machine vision system according to claim 6, wherein the processor is further configured to determine the working distance based on the distance data.

8. The machine vision system according to claim 1, wherein adjusting the curvature of the adjustable membrane of the liquid lens and adjusting the distance between the lens assembly and the image sensor controls at least one of a focal length or an aperture value.

9. The machine vision system according to claim 1, wherein the processor device is further configured to control an adjustment of a distance between the liquid lens and the image sensor.

10. The machine vision system according to claim 1, wherein the processor device is further configured to control an adjustment of a distance between the plurality of solid lens elements and the image sensor.

11. The machine vision system according to claim 1, wherein the processor device is further configured to control an adjustment of a distance between the plurality of solid lens elements and the liquid lens.

12. An optical assembly for a vision system having an image sensor, the optical assembly comprising:
    a lens assembly comprising:
        a plurality of solid lens elements; and
        at liquid lens, wherein the liquid lens includes an adjustable membrane; and
    a motor system coupled to the lens assembly and configured to move the lens assembly to adjust a distance between the lens assembly and the image sensor of the vision system.

13. The optical assembly according to claim 12, wherein the motor system is further configured to move the liquid lens to adjust a distance between the liquid lens and the image sensor and to adjust a distance between the liquid lens and the plurality of solid lens elements.

14. The optical assembly according to claim 12, wherein the lens assembly further comprises an aperture having a fixed size.

15. The optical assembly according to claim 12, wherein the motor system comprises a micromotor.

16. The optical system according to claim 15, wherein the micromotor is a micro-step motor.

17. The optical assembly according to claim 15, wherein the motor system is configured to move the lens assembly toward or away from the image sensor.

18. The optical assembly according to claim 12, wherein the motor system is further configured to move the plurality of solid lens elements to adjust a distance between the plurality of solid lens elements and the image sensor and to adjust a distance between the plurality of solid lens elements and the liquid lens.

19. The optical assembly according to claim 12, wherein the motor system is further configured to move the plurality of solid lens elements in a first direction and to move the liquid lens in a second direction that is different than the first direction.

20. A method for controlling focal length and aperture value of a machine vision system, the method comprising:
   determining a working distance between an object and a lens assembly of the machine vision system, wherein the lens assembly comprises a plurality of solid lens elements and a liquid lens including an adjustable membrane;
   adjusting a curvature of the adjustable membrane of the liquid lens based on the working distance; and
   adjusting, using a motor system, a distance between the lens assembly and an image sensor based on the working distance.

21. The method according to claim 20, further comprising acquiring an image of the object via the machine vision system.

22. The method according to claim 20, wherein determining the working distance between the object and the lens assembly includes determining the working distance based on distance data received from a distance sensor.

23. The method according to claim 20, wherein adjusting the curvature of the adjustable membrane of the liquid lens and adjusting the distance between the lens assembly and the image sensor controls at least one of a focal length or an aperture value.

24. The method according to claim 23, wherein the focal length controls a field of view (FOV) and a magnification.

25. The method according to claim 23, wherein the aperture value controls an amount of light received by the image sensor and a depth of field (DOF).

26. The method according to claim 20, wherein adjusting the distance between the lens assembly and an image sensor comprises changing a position of the lens assembly.

27. The method according to claim 20, wherein adjusting the distance between the lens assembly and an image sensor comprises changing a position of the liquid lens.

28. The method according to claim 20, wherein adjusting the distance between the lens assembly and an image sensor comprises changing a position of the plurality of solid lens elements.

29. The method according to claim 20, further comprising adjusting, using the motor system, a distance between the plurality of solid lens elements and the liquid lens by changing a position of the solid lens elements along a first direction and changing a position of the liquid lens along a second direction that is different than the first direction.

* * * * *